United States Patent
Sato et al.

(10) Patent No.: US 10,161,516 B2
(45) Date of Patent: Dec. 25, 2018

(54) SHIFT CONTROL APPARATUS AND SHIFT CONTROL METHOD

(71) Applicant: HONDA MOTOR CO., LTD., Tokyo (JP)

(72) Inventors: Atsushi Sato, Wako (JP); Hirofumi Akagi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 319 days.

(21) Appl. No.: 15/029,897

(22) PCT Filed: Aug. 11, 2014

(86) PCT No.: PCT/JP2014/004171
§ 371 (c)(1),
(2) Date: Apr. 15, 2016

(87) PCT Pub. No.: WO2015/056382
PCT Pub. Date: Apr. 23, 2015

(65) Prior Publication Data
US 2016/0252180 A1   Sep. 1, 2016

(30) Foreign Application Priority Data

Oct. 18, 2013 (JP) ................... 2013-217825

(51) Int. Cl.
*F16H 61/662* (2006.01)
*F16H 59/18* (2006.01)
(Continued)

(52) U.S. Cl.
CPC . *F16H 61/66272* (2013.01); *F16H 61/66259* (2013.01); *F16H 59/18* (2013.01); *F16H 59/44* (2013.01); *F16H 2059/147* (2013.01)

(58) Field of Classification Search
CPC ............... F16H 59/18; F16H 61/66259; F16H 61/66272; B60W 10/04; B60W 10/101
See application file for complete search history.

(56) References Cited

U.S. PATENT DOCUMENTS

| 2011/0015840 A1* | 1/2011 | Takahashi | F16H 61/061 701/58 |
| 2012/0245807 A1* | 9/2012 | Kurahashi | F16H 61/66259 701/51 |
| 2013/0172148 A1* | 7/2013 | Wiencek | F02D 31/007 477/77 |

FOREIGN PATENT DOCUMENTS

| JP | 62-228742 A | 10/1987 |
| JP | 4-185957 A | 7/1992 |

(Continued)

OTHER PUBLICATIONS

Intrenational Search Report dated Oct. 21, 2014, issued in counterpart Application No. PCT/JP2014/004171 (2 pages).

*Primary Examiner* — Edwin A Young
(74) *Attorney, Agent, or Firm* — Westerman, Hattori, Daniels & Adrian, LLP

(57) ABSTRACT

A shift control apparatus for a vehicle which has an engine with an exhaust supercharger, and a transmission, if there is a deceleration intention of a driver, compares a target torque and an actual torque, and while the actual torque is higher than the target torque and a difference therebetween is greater than or equal to a predetermined threshold value, controls a speed at which to cause a gear ratio of the transmission to change to the target gear ratio to be slower than at a time of normal shift control.

5 Claims, 5 Drawing Sheets

(51) Int. Cl.
*F16H 59/44* (2006.01)
*F16H 59/14* (2006.01)

(56) References Cited

FOREIGN PATENT DOCUMENTS

| | | |
|---|---|---|
| JP | 7-280052 A | 10/1995 |
| JP | 10-9379 A | 1/1998 |
| JP | 2008-232180 A | 10/2008 |

\* cited by examiner

SHIFT CONTROL APPARATUS AND SHIFT CONTROL METHOD

TECHNICAL FIELD

The present invention relates to a technique for shift control of a vehicle.

BACKGROUND ART

Patent Document 1, for example, describes that, because an engine equipped with an exhaust supercharger (a turbo) becomes unable to perform prompt acceleration if a transient state occurs in a period until an exhaust gas amount increases, increasing number of rotations of the supercharger after an accelerator pedal is stepped on, generating so-called turbo lag, to detect such turbo lag and perform prompt acceleration in accordance with a stepped-on state of the accelerator pedal, a shift-down signal is output from an equipped control means, and an automatic transmission shifts down to cause output torque to increase.

PRIOR ART DOCUMENT

Patent Document

PATENT DOCUMENT 1: Japanese Patent Laid-Open No. 62-228742

SUMMARY OF INVENTION

Problems that the Invention is to Solve

Although the above Patent Document 1 discloses means for solving an acceleration delay that occurs when an accelerator pedal is stepped on, in other words turbo lag, there is no description regarding means for reducing a deceleration delay when a stepped-on accelerator pedal is returned.

In an engine equipped with an exhaust supercharger, although it is possible to adjust an accelerator position and a fuel injection amount when a stepped-on accelerator pedal is returned, because exhaust continues, a turbine continues rotating without stopping, and because of this torque-down is delayed due to a supercharging pressure not decreasing.

In this way, if an engine torque does not decrease even if the accelerator pedal is returned, it comes into a state where engine brake efficacy becomes ineffective against the intention of a driver to apply the engine brake, and the driver may feel a sense of unnaturalness.

The present invention has been made in consideration of the above-described problem, and has as its object to realize a technique that can reduce a sense of unnaturalness felt by a driver by a delay of a gear ratio transitioning to a minimum reduction gear ratio (OD) side if a torque-down is delayed in contrast to a deceleration intention of the driver.

Means for Solving the Problems

In order to solve the above problem, and achieve the object, in a first aspect according to the present invention, a shift control apparatus for a vehicle which has an engine (1) with an exhaust supercharger (4), and a transmission (3) capable of shift control, comprising: accelerator position detecting means (101) for detecting an accelerator position (AP); determination means (100, step S401) for determining from the accelerator position (AP) a deceleration intention of a driver; target torque calculation means (100, step S402) for calculating from the accelerator position (AP) a target torque (T1) of the engine (1); actual torque calculating means (100, step S403) for calculating an actual torque (T) of the engine (1); and control means (100) for controlling a gear ratio of the transmission (3), characterized in that if it is determined by the determination means that there is the deceleration intention of the driver, the control means (100) compares the target torque and the actual torque, and while the actual torque is higher than the target torque and a difference therebetween is greater than or equal to a predetermined threshold value (step S305), controls a speed at which to cause a gear ratio of the transmission to change to the target gear ratio to be slower than at a time of normal shift control (step S406).

In a second aspect according to the present invention, the target gear ratio is predetermined according to a vehicle speed and an accelerator position (FIG. 5), and is set so as to transition to a minimum reduction gear ratio side when the accelerator position has changed to a closed side.

In a third aspect according to the present invention, the predetermined threshold value is set so as the value decreases in accordance with an elapsed time period after the accelerator position has changed to the closed side (FIG. 6).

In a fourth aspect according to the present invention, the transmission is a continuously variable transmission (3).

In a fifth aspect according to the present invention, a method of shift control for a vehicle which has an engine (1) with an exhaust supercharger (4), and a transmission (3) capable of shift control, the method characterized by comprising: a determination step (step S401) of determining from an accelerator position (AP) a deceleration intention of a driver; a target torque calculation step (step S402) of calculating from the accelerator position (AP) a target torque (T1) of the engine (1); an actual torque calculation step (step S403) for calculating an actual torque (T) of the engine (1); and a control step of controlling a gear ratio of the transmission (3) (step S405, step S406, and step S407), characterized in that if it is determined by in the determination step that there is the deceleration intention of the driver, in the control step, the target torque and the actual torque is compared, and while the actual torque is higher than the target torque and a difference therebetween is greater than or equal to a predetermined threshold value (step S405), a speed at which to cause a gear ratio of the transmission to change to the target gear ratio is caused to be slower than at a time of normal shift control (step S406).

Effects of the Invention

According to the present invention, in a case where a torque-down is delayed relative to a deceleration intention of a driver, by performing shift control so as set a rate of change to a target gear ratio to be slower than normal, because a vehicle speed will decelerate so as to not cause an engine speed of revolution to suddenly decrease, it is possible to delay a transition of the gear ratio to a minimum reduction gear ratio (OD) side, to increase an engine brake amount, and reduce a sense of unnaturalness felt by the driver.

Specifically, according to the first and fifth aspects according to the present invention, if an actual engine torque is larger than a target engine torque, by delaying a gear shift speed to a target gear ratio, configuration is such that a current engine speed of revolution is not caused to suddenly decrease, and a sense of unnaturalness felt by a driver by a deceleration delay can be reduced.

In addition, according to the second aspect according to the present invention, it is possible to reduce a sense of unnaturalness felt by a driver due to a deceleration delay by delaying a speed of a gear shift to the target gear ratio with respect to a vehicle speed tending not to decrease in normal shift-control due to transitioning the target gear ratio to the minimum reduction gear ratio (OD) side when the accelerator pedal is returned.

According to the third aspect according to the present invention, although a difference between an actual engine torque and a target engine torque becomes smaller as deceleration proceeds, because a threshold value also becomes smaller in response to that, it is possible to avoid a state where engine brake efficacy becomes ineffective because normal shift control is suddenly returned to part way through control to delay a gear shift speed to the target gear ratio.

According to the fourth aspect according to the present invention, it is possible to easily control a gear shift speed because it is a continuously variable transmission.

Other characteristics and advantages of the present invention should become clear by the following explanation that references the attached drawings. Note that, in the attached drawings, identical reference numerals are given to similar configurations.

BRIEF DESCRIPTION OF DRAWINGS

The accompanying drawings are included in the specification, configure a portion thereof, illustrate embodiments of the present invention, and together with descriptions of the embodiments, are used in an explanation of the principles of the present invention.

DESCRIPTION OF EMBODIMENTS

Below, embodiments of the present invention are explained in detail with reference to the accompanying drawings. Mote that embodiments explained below are only examples of means to realize the present invention, and the present invention is applicable to changes and modifications of the embodiments below that are within a scope that does not deviate from the spirit of the present invention. In addition, although explanation is given below in relation to an example that applies the shift control of the present invention to an automobile powertrain comprised from an engine and a continuously variable transmission, but it goes without saying that it can be applied to an automatic transmission of a hybrid automobile, an electric automobile, or another vehicle.

<Powertrain Configuration> Firstly, A configuration of an automobile powertrain in which the continuously variable transmission of the present embodiment is incorporated will be described with reference to FIG. 1.

Figure 1:
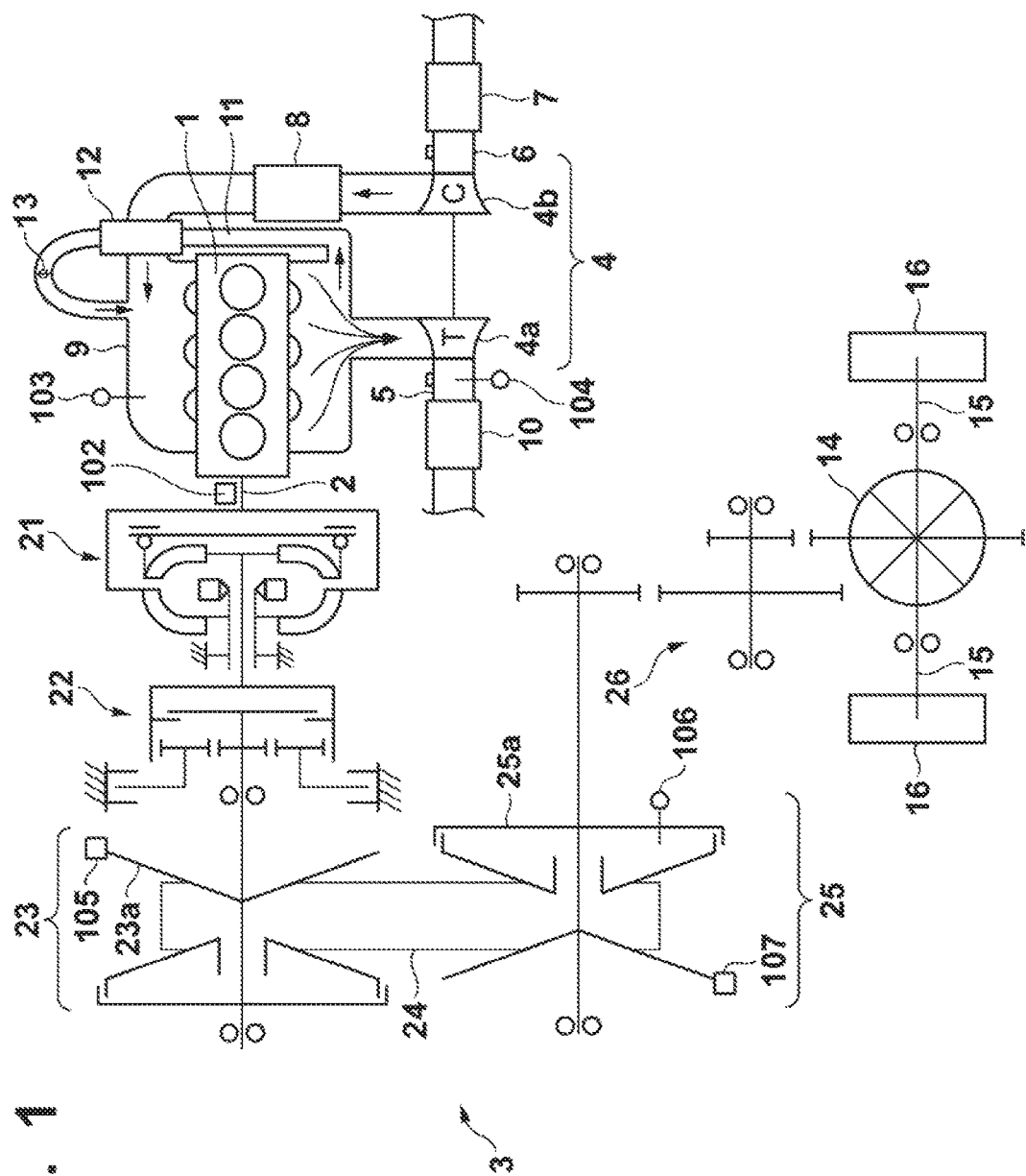
FIG. 1 A view that illustrates a configuration of an automobile powertrain of the present embodiment.

As illustrated in FIG. 1, an engine 1 is a diesel engine that is equipped with an exhaust supercharger (a turbo), and has four cylinders, and a driving force is transmitted from a crankshaft 2 to a continuously variable transmission (CVT) 3. An exhaust supercharger 4 comprises a turbine 4a and a compressor 4b that rotate simultaneously: simultaneously to the turbine 4a, which is arranged in an exhaust passage 5, being rotationally driven by pressure of exhaust gas, the compressor 4b, which is arranged in an intake passage 6, is rotationally driven. The compressor 4b sucks in outside air via an air cleaner 7, and air cooled by an intercooler 8 is introduced into an intake manifold 9. Exhaust gas after combustion is discharged externally after cleaning via a catalyst 10 provided downstream of the turbine 4a in the exhaust passage 5. A portion of the exhaust gas after combustion is recirculated within the intake manifold 9 by an EGR (exhaust gas recirculation) passage 11, is cooled by an EGR cooler 12 arranged in the EGR passage 11, and introduced within the intake manifold 9 after a flow amount is adjusted by an EGR valve 13.

The driving force of the engine 1 is input to the CVT 3 from the crankshaft 2, transmitted from the CVT 3 to left and right axles 15 via a differential gear 14, and drives driving wheels 16.

The CVT 3 comprises a torque converter (lock-up) 21, a planetary gear mechanism 22, a primary (drive) pulley 23, a rotation belt 24, a secondary (driven) pulley 25, and an output gear mechanism 26. Revolution of the engine 1 is transmitted from the crankshaft 2 to the torque converter 21, and after a rotation direction of an output axis of the torque converter 21 is switched forward or backwards by the planetary gear mechanism 22, it is transmitted to the primary pulley 23, and then transmitted from the secondary pulley 25 to the output gear array 26 at a gear ratio set by the primary pulley 23, the rotation belt 24, and the secondary pulley 25.

<Control Configuration> Next, an apparatus configuration of the present embodiment will be described with reference to FIG. 1 and FIG. 2.

Figure 2:
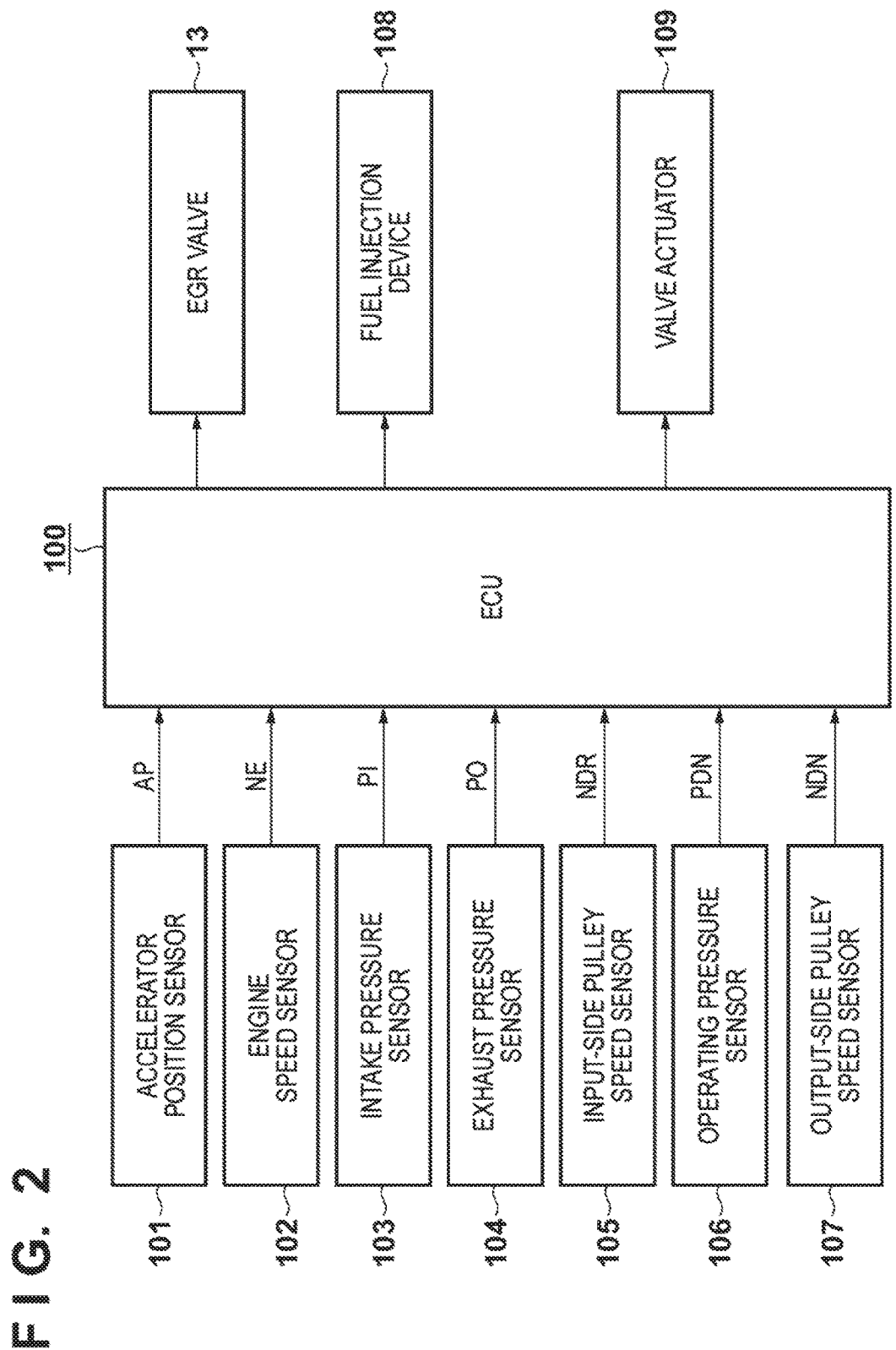
FIG. 2 A block diagram illustrating a device configuration of the present embodiment.

As illustrated in FIG. 1 and FIG. 2, an ECU 100 is a known microcomputer-based controller, and comprises a central arithmetic processing unit (CPU) that executes a shift control program or an engine control program that are described later, a RAM that stores parameters or the like and is used as a work area of the above control programs, and a ROM that stores the above control programs, a gear ratio map, or the like.

An accelerator position sensor 101 detects an accelerator position AP from a stepping amount of an accelerator pedal (not shown), and outputs a detection signal to the ECU 100.

An engine speed sensor 102 detects a speed of rotation NE of the crankshaft 2 of the engine 1, and outputs a detection signal to the ECU 100.

An intake pressure sensor 103 detects an intake pressure PI in the intake manifold 9, and outputs a detection signal to the ECU 100.

An exhaust pressure sensor 104 detects an exhaust pressure PO in the exhaust passage 5, and outputs a detection signal to the ECU 100.

An input-side pulley speed sensor 105 detects a speed of rotation NDR of an input-side pulley 23a of the primary pulley 23, and outputs a result of the detection to the ECU 100.

An operating pressure sensor 106 detects an operating pressure PDN of a drive-side pulley 25a of the secondary pulley 25, and the ECU 100 calculates a current gear ratio from the operating pressure PDN.

An output-side pulley speed sensor 107 detects a speed of rotation NDN of the secondary pulley 25, and the ECU 100 calculates a vehicle speed V from the pulley speed of rotation NDN.

In addition to each of the above described detection signals, the ECU 100 calculates engine control signals such as throttle position, a fuel injection amount, an injection timing, or an ignition timing, based on an intake temperature, an intake humidity, an engine water temperature, an intake flow amount, oxygen concentration of exhaust gas, or the like, and controls a fuel injection device 108, an EGR valve 12, or the like.

Figure 5:
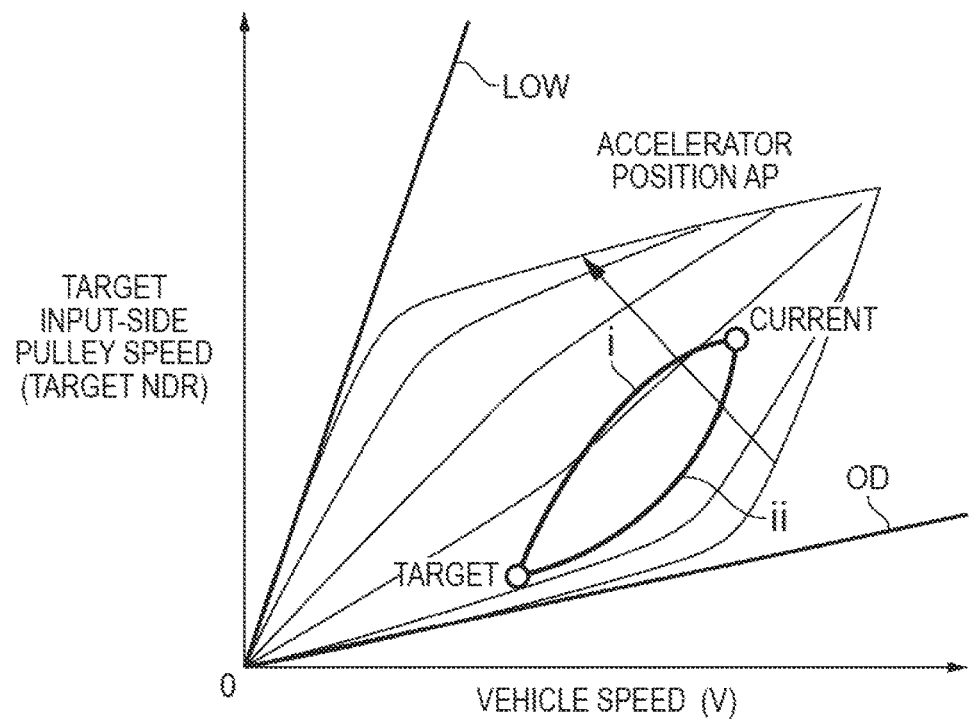
FIG. 5 A view illustrating a gear ratio map of the present embodiment.

From the vehicle speed V and the input-side pulley speed of rotation NDR of the primary pulley 23, the ECO 100 obtains a target gear ratio by referring to the gear ratio map illustrated in FIG. 5, calculates a shift (oil pressure) control signal in accordance with the target gear ratio, and controls a valve actuator 109 of the CVT 3, and the like.

<Torque-down Control> Next, a torque-down control of the present embodiment will be described with reference to FIG. 3.

With the engine 1 that comprises the turbocharger 4 as in the present embodiment, there may be cases in which in spite of the fact that a driver-has returned the accelerator pedal, torque-down is delayed and deceleration does not occur, with the engine brake not taking effect immediately. With this, an operational feeling felt by the driver is referred to as a free running feeling.

Figure 3:
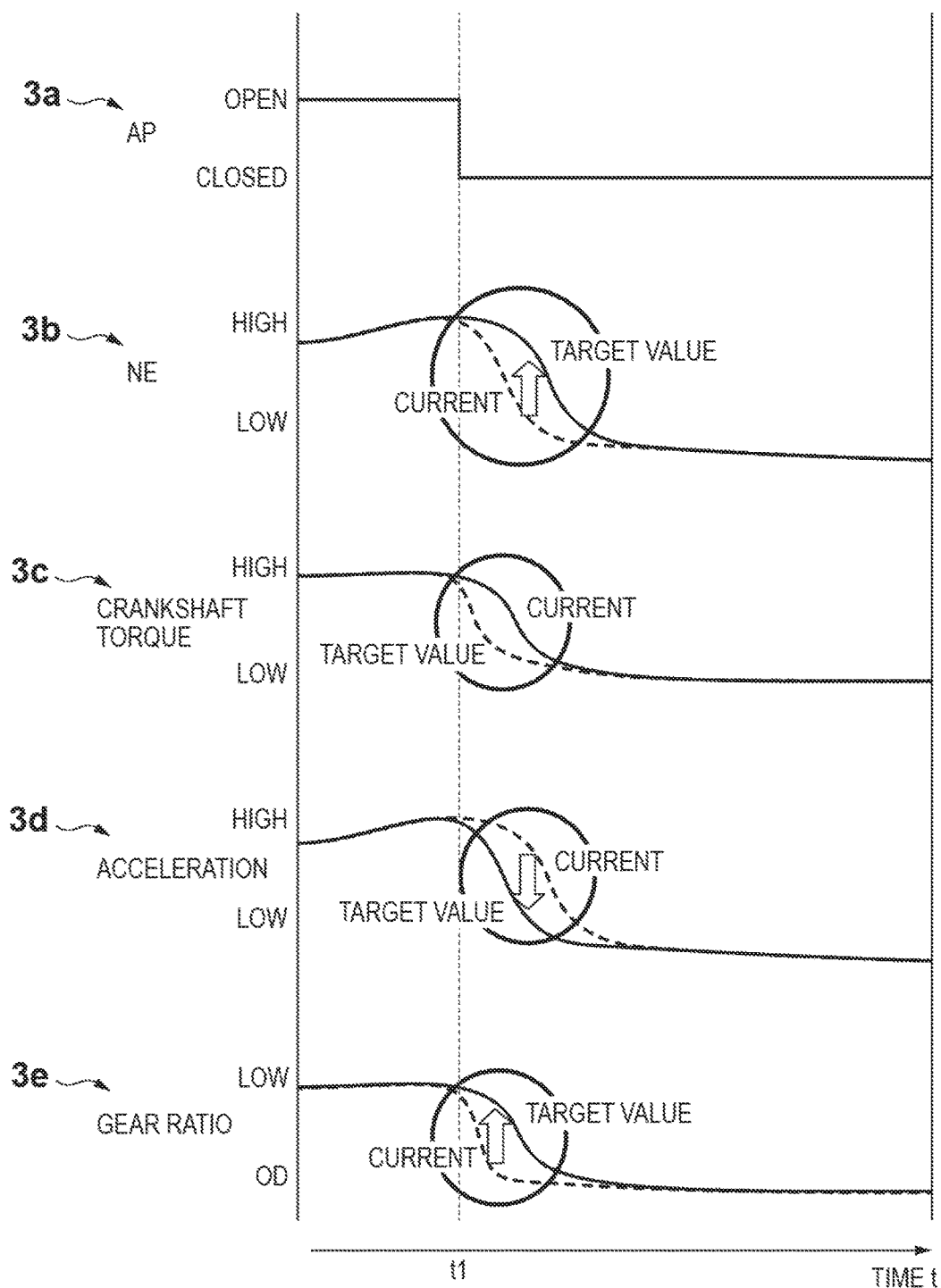
FIG. 3 A view for explaining shift control of the present embodiment.

As illustrated in FIG. 3, not decelerating (dotted line in circle of (d)) even if the accelerator-pedal is returned (AP off, timing t1 in (a)) is due to a delay in reduction of crankshaft torque by the effect of supercharging pressure not being reduced because the turbine 4a and the compressor 4b continue to rotate (solid line in circle of (c)). In addition, in the CVT, because the gear ratio map as illustrated in FIG. 5 is set in advance, a target input-side pulley speed of rotation (target NDR) is determined from the accelerator position AP and the output-side pulley speed of rotation NDN (vehicle speed V), and shift-control is performed so that the actual input-side pulley speed of rotation NDR becomes the target input-side pulley speed of rotation (target NDR), if the accelerator pedal is returned, the target input-side pulley speed of rotation (target NDR) decreases, and it becomes difficult to reduce the vehicle speed to transition the target gear ratio to the minimum reduction gear ratio (OD: overdrive) side.

Accordingly, in the present embodiment, as a countermeasure to such a deceleration delay, if it is determined that a torque-down is late after an operation for returning the accelerator pedal, by performing shift control is performed so that a rate of change to the target gear ratio is slower than normal (the solid line in the circle of (e)), thereby the engine speed of revolution does not rapidly decrease (the solid line in the circle of (b)). In this way, by causing a transition of the gear ratio to the minimum reduction gear ratio (OD) side to be delayed, an engine brake amount is increased, and the idle running feeling is caused to decrease. Note that in the case where the free running feeling is resolved, control is performed so as to immediately reduce the engine speed of revolution.

Figure 4:
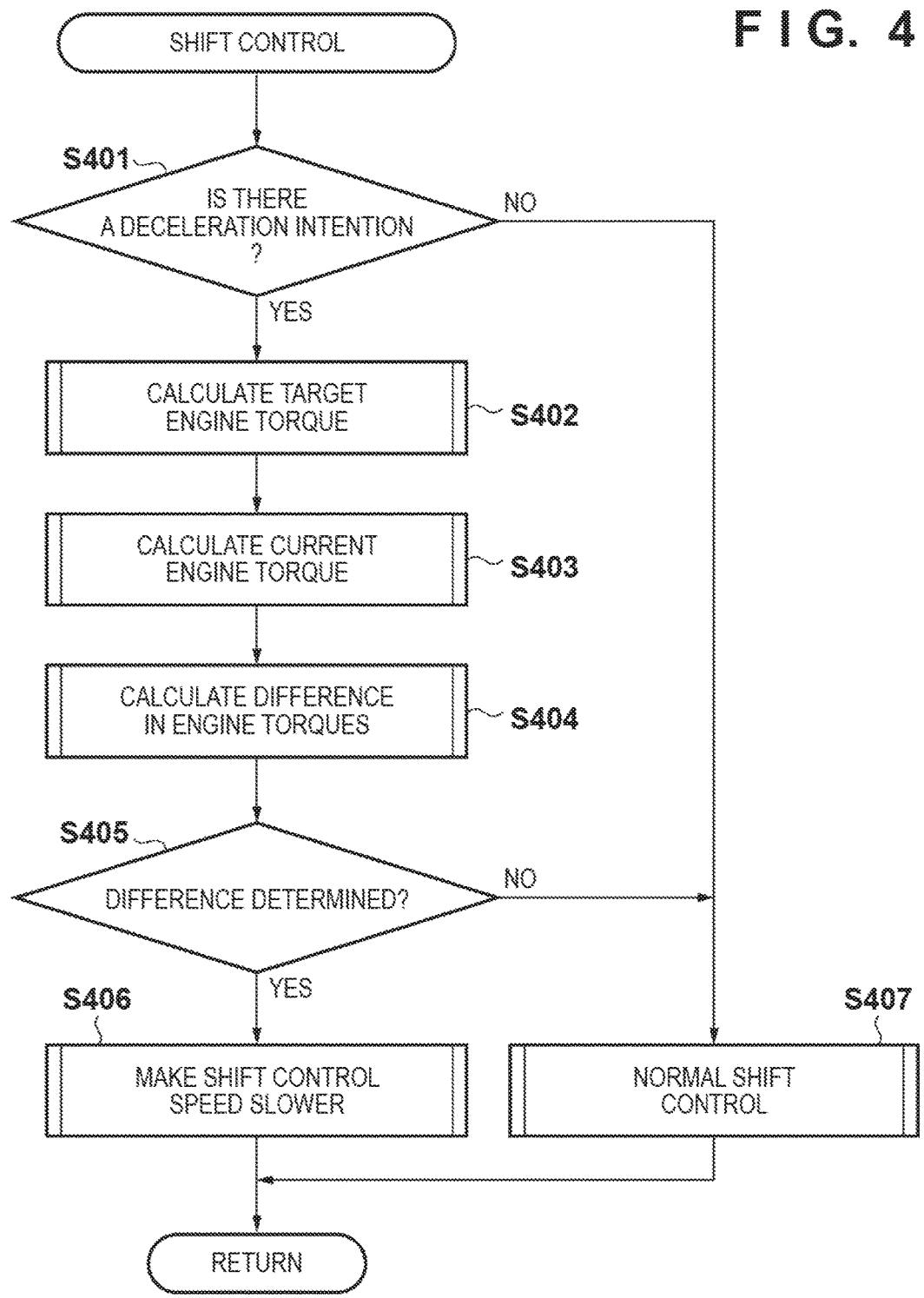
FIG. 4 flowchart illustrating a shift control procedure of the present embodiment.

FIG. 4 is a flowchart for illustrating a shift control procedure that the ECU of the present embodiment executes.

In step S401, the ECU 100 calculates the accelerator position and an opening/closing speed, and determines whether the accelerator position has changed to a closed side by a driver performing an operation to return the accelerator pedal (deceleration intention determination). If the result of the determination is that the driver performed an operation to return the accelerator pedal, the processing proceeds to step S402; if the operation was not performed the processing proceeds to step S407.

In step S402 the ECU 100 calculates a target engine torque T1 from the accelerator position AP and the engine speed of revolution NE.

In step S403, the ECU 100 calculates a current engine torque T from the engine speed of revolution NE, the intake pressure PI and the exhaust pressure PO. Here, if the engine speed of revolution NE is high and the turbine 4a is rotating, it can be determined that the state is such that the exhaust pressure PO and the intake pressure PI are high, and that the actual engine torque T is high.

In step S404 the ECU 100 calculates a difference between the target engine torque 11 calculated in step S402 and the current engine torque T calculated in step S403.

Figure 6:
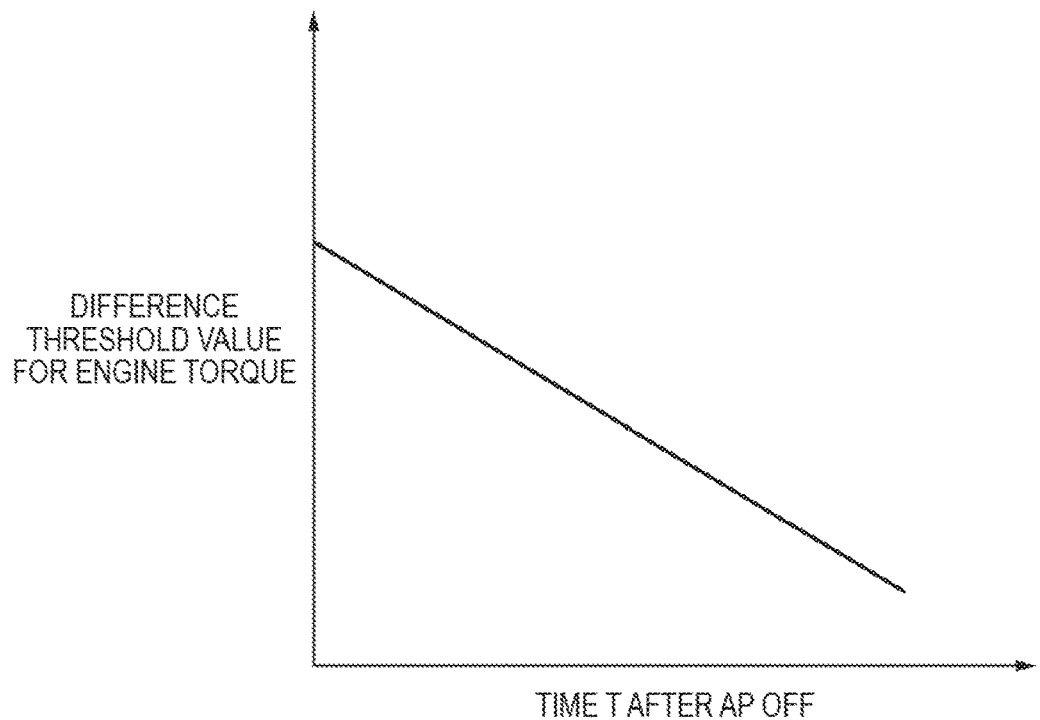
FIG. 6 A view illustrating a threshold value table of a difference in engine torque used in shift control of the present embodiment.

In step S405, the ECU 100 determines, from the difference calculated in step S404, whether the current engine torque T is larger than the target engine torque T1 by a predetermined threshold value or more. If the result of the determination is that the difference is greater than or equal to the threshold value, the processing proceeds to step S406; if the difference is less than the threshold value the processing proceeds to step S407. Note that the threshold value is set so that a value thereof becomes smaller in accordance with an elapsed time period t after the accelerator pedal is returned, as illustrated in FIG. 6. If the threshold value is set in this way, even if a difference between the actual engine torque T and the target engine torque T1 becomes smaller as deceleration proceeds, because the threshold value also becomes smaller accordingly, a state such as when normal shift control is suddenly returned to part way through control to delay the gear shift speed to the target gear ratio, and engine brake efficacy becomes ineffective can be avoided. In other words, it is possible to lengthen a period of control to slow the gear shift speed to the target gear ratio, and gradually change to normal shift control.

In step S406, the ECU 100 refers to the gear ratio map illustrated in FIG. 5 to calculate a target input-side pulley speed of rotation (target NDR) from the accelerator position AP and the output-side pulley speed of rotation NDN (vehicle speed V). Here, by maintaining the target input-side pulley speed of rotation (target NDR) until the difference between the target engine torque T1 and the current engine torque T fall below the threshold value, the ECU 100 performs shift control ((i) of FIG. 5) so that it is difficult for input-side pulley speed of rotation NDR to reach the target input-side pulley speed of rotation (target NDR), in other words, so that a rate of change to the target gear ratio is slower than normal (so that the target gear ratio is maintained at a LOW side).

In step S407, because there is no deceleration intention of the driver (NO in step S401), and the difference in engine torque is less than the threshold value (NO in step S406), the ECU 100 performs normal shift control ((ii) of FIG. 5).

As described above, according to the present embodiment, by performing shift control so that a rate of change to the target gear ratio is slower than normal if a torque-down is slower than a deceleration intention of a driver, because a vehicle speed decelerates so as to not cause a sudden decrease of an engine speed of revolution, a transition of a gear ratio to a minimum reduction gear ratio (OD) side is caused to be delayed, and it is thereby possible to reduce a free running feeling by increasing an engine brake amount.

Note that, for the present invention, configuration may also be taken such that a computer program corresponding to shift control of the above-described embodiments, or a computer-readable storage medium storing the computer program is supplied to a computer incorporated in a vehicle, and a program code that the computer has stored in the non-transitory computer-readable storage medium is read and executed.

The present invention is not limited to the above-described embodiments, and various changes and modifications are possible without deviating from the spirit and scope of the present invention. Accordingly, the following claims are attached to make public the scope of the present invention.

This application claims priority from Japanese Patent Application No. 2013-217825 filed Oct. 18, 2013, which is hereby incorporated by reference herein.

EXPLANATION OF REFERENCE NUMERALS 1 engine
2 crankshaft
3 continuously variable transmission (CVT)
4 exhaust supercharger (turbo)
5 exhaust passage
6 intake passage
7 air cleaner
8 intercooler
9 intake manifold
10 catalyst
11 EGR (exhaust gas recirculation) passage
12 EGR cooler
13 EGR valve
14 differential gear
15 axle
16 driving wheel
21 torque converter
22 planetary gear mechanism
23 primary pulley
24 rotation belt
25 secondary pulley
26 output gear mechanism
100 ECU
101 accelerator position sensor
102 engine speed sensor
103 intake pressure sensor
104 exhaust pressure sensor
105 input-side pulley speed sensor
106 operating pressure sensor
107 output-side pulley speed sensor

The invention claimed is:

1. A shift control apparatus for a vehicle which has an engine with an exhaust supercharger, and a transmission capable of shift control, comprising:
an accelerator position detecting unit configured to detect an accelerator position;
a determination unit configured to determine from the accelerator position a deceleration intention of a driver;
a target torque calculation unit configured to calculate from the accelerator position a target torque of the engine;
an actual torque calculating unit configured to calculate an actual torque of the engine; and
a control unit configured to control a gear ratio of the transmission,
wherein when it is determined by the determination unit that there is the deceleration intention of the driver, the control unit compares the target torque and the actual torque, and while the actual torque is higher than the target torque and a difference therebetween is greater than or equal to a predetermined threshold value, controls a speed at which to cause a gear ratio of the transmission to change to a target gear ratio to be slower than at a time of normal shift control, and
wherein the predetermined threshold value is set so the value decreases in accordance with an elapsed time period after the accelerator position has changed to a closed side.

2. The shift control apparatus according to claim 1, wherein the target gear ratio is predetermined according to a vehicle speed and the accelerator position, and is set so as to transition to a minimum reduction gear ratio side when the accelerator position has changed to the closed side.

3. The shift control apparatus according to claim 1, wherein the transmission is a continuously variable transmission.

4. A method of shift control for a vehicle which has an engine with an exhaust supercharger, and a transmission capable of shift control, the method comprising:
a determination step of determining from an accelerator position a deceleration intention of a driver;
a target torque calculation step of calculating from the accelerator position a target torque of the engine;
an actual torque calculation step for calculating an actual torque of the engine; and
a control step of controlling a gear ratio of the transmission,
wherein when it is determined in the determination step that there is the deceleration intention of the driver, in the control step, the target torque and the actual torque is compared, and while the actual torque is higher than the target torque and a difference therebetween is greater than or equal to a predetermined threshold value, a speed at which to cause a gear ratio of the transmission to change to a target gear ratio is caused to be slower than at a time of normal shift control.

5. A computer-readable storage medium storing a program for causing a computer to execute a method of shift control for a vehicle comprising an engine with an exhaust supercharger, and a transmission capable of shift control, the method comprising:
a determination step of determining from an accelerator position a deceleration intention of a driver;
a target torque calculation step of calculating from the accelerator position a target torque of the engine;
an actual torque calculation step for calculating an actual torque of the engine; and
a control step of controlling a gear ratio of the transmission,
wherein when it is determined in the determination step that there is the deceleration intention of the driver, in the control step, the target torque and the actual torque is compared, and while the actual torque is higher than the target torque and a difference therebetween is greater than or equal to a predetermined threshold value, a speed at which to cause a gear ratio of the transmission to change to a target gear ratio is caused to be slower than at a time of normal shift control.

* * * * *